(No Model.)
V. D. ANDERSON.
DRIER.
No. 352,907. Patented Nov. 23, 1886.
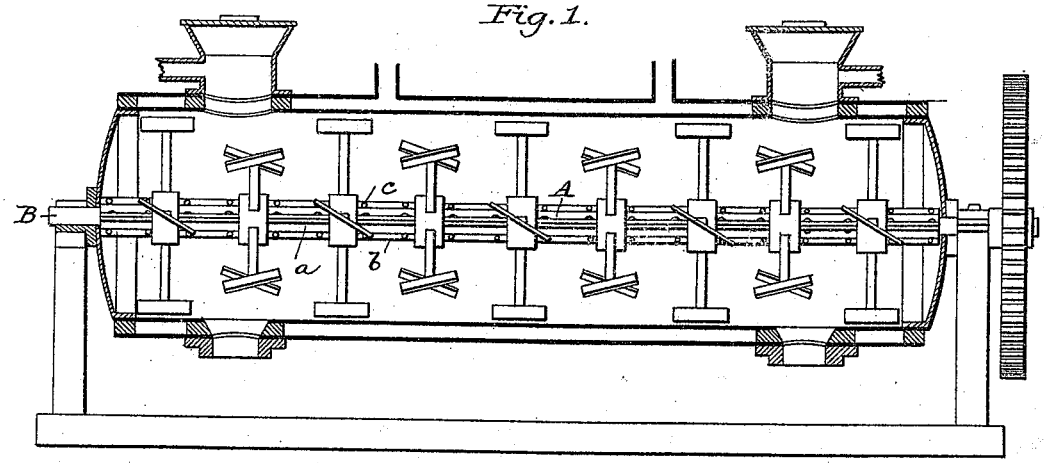
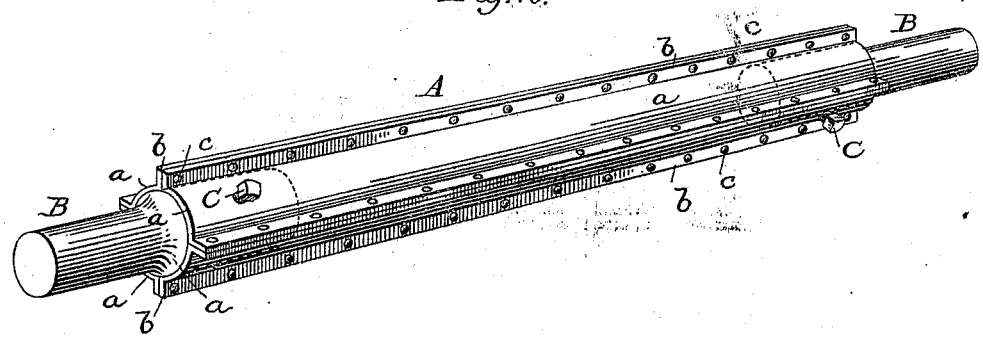
Witnesses:
James P. DuHamel
Walter S. Dodge
Valerius D. Anderson
Inventor,
by Dodge & Son,
his Attys.

UNITED STATES PATENT OFFICE.

VALERIUS D. ANDERSON, OF CLEVELAND, OHIO.

DRIER.

SPECIFICATION forming part of Letters Patent No. 352,907, dated November 23, 1886.

Application filed May 5, 1886. Serial No. 201,210. (No model.)

*To all whom it may concern:*

Be it known that I, VALERIUS D. ANDERSON, of Cleveland, in the county of Cuyahoga and State of Ohio, have invented certain new and useful Improvements in Driers, of which the following is a specification.

My invention relates to driers, such as are used for desiccating or drying offal, fertilizing materials, and the like; and the invention consists in providing the machine with a stirrer or beater shaft of peculiar construction, whereby the shaft may be made of great length without liability of sagging or springing in operation.

Prior to my invention it has been customary to construct such shafts either in the form of a solid cylinder or as a hollow or tubular shaft. Both these plans, as hitherto carried out, are defective, in that the shaft is not made sufficiently stiff and self-supporting to prevent sagging or springing, as above mentioned, and the solid shaft is objectionable on account of its cost and unnecessary weight.

My invention obviates all difficulties experienced under former plans, and consists in forming the shaft of a series of flanged segmental plates, which, when united by their flanges, produce a buttressed shaft that is at once light, strong, and stiff in all directions.

In the annexed drawings, Figure 1 is a longitudinal section of a drier of ordinary pattern, showing my improved shaft in position. Fig. 2 is a perspective view of the shaft detached and removed from the machine.

A indicates the shaft as a whole, which consists of a series of segmental plates, $a$, of any desired length, and formed with flanges $b$, which, when the shaft is completed, stand radial or practically radial to the axis of the shaft, as shown in Fig. 2. The plates or sections $a$ are united by rivets $c$, passing through the abutting or facing flanges $b$, and the ribs thus formed by the flanges give great stiffness and strength to the shaft.

It is necessary that a cylindrical journal be formed at each end of the shaft A, and I therefore provide two cylindrical end pieces, B B, which are inserted into the ends of the shaft A a suitable distance, and secured in such position by set-screws C, or in any equivalent or suitable manner. The projecting ends $d$ of the end pieces, B B, constitute journals for the shaft, and may be made long enough to receive gear or band wheels, or whatever appurtenances are necessary to be placed upon the shaft.

The shaft will carry stirrers, beaters, mixers, scrapers, or any other usual devices for acting upon the material in the drier. My present invention concerns only the shaft, however, and the other parts of the machine may be varied indefinitely.

Having thus described my invention, what I claim is—

The herein-described shaft for driers and like machinery, consisting of a series of flanged segmental plates united by their flanges, and provided with cylindrical journals or end pieces, substantially as shown.

VALERIUS D. ANDERSON.

Witnesses:
H. CLARK FORD,
WALTER A. BIDDLE.